(12) United States Patent
Leng

(10) Patent No.: US 11,140,986 B2
(45) Date of Patent: Oct. 12, 2021

(54) PLASTIC COMPOSITE BOARD

(71) Applicant: New-Tec Integration (Xiamen) Co., Ltd., Xiamen (CN)

(72) Inventor: Luhao Leng, Xiamen (CN)

(73) Assignee: New-Tec Integration (Xiamen) Co., Ltd., Fujian (CN)

( * ) Notice: Subject to any disclaimer, the term of this patent is extended or adjusted under 35 U.S.C. 154(b) by 0 days.

(21) Appl. No.: 16/875,099

(22) Filed: May 15, 2020

(65) Prior Publication Data
US 2020/0275780 A1    Sep. 3, 2020

Related U.S. Application Data

(63) Continuation of application No. PCT/CN2018/115532, filed on Nov. 15, 2018.

(30) Foreign Application Priority Data

Nov. 15, 2017  (CN) .......................... 201721526196.3

(51) Int. Cl.
*A47B 13/08*    (2006.01)
*A47B 96/20*    (2006.01)
(Continued)

(52) U.S. Cl.
CPC .............. *A47B 96/206* (2013.01); *B32B 3/12* (2013.01); *B32B 7/08* (2013.01); *B32B 27/08* (2013.01);
(Continued)

(58) Field of Classification Search
CPC . A47B 13/083; A47B 13/08; A47B 2200/001; A47B 96/205; B32B 2479/00; B32B 3/04; E04C 2/365; E04C 2/20
See application file for complete search history.

(56) References Cited

U.S. PATENT DOCUMENTS 2,353,777 A * 7/1944 Weissert .................. E03C 1/33
   52/796.12
2,940,805 A * 6/1960 Nordmark ............ A47B 13/083
   108/27
(Continued)

FOREIGN PATENT DOCUMENTS

CN    201299266 Y    9/2009
CN    205162320 U    4/2016
(Continued)

OTHER PUBLICATIONS

International Search Report and Written Opinion with English Translation of ISR, cited in PCT/CN2018/115532 dated Feb. 26, 2019, 15 pages.

*Primary Examiner* — Brian E Glessner
*Assistant Examiner* — Daniel J Kenny
(74) *Attorney, Agent, or Firm* — Cooper Legal Group, LLC

(57) ABSTRACT

The present disclosure discloses plastic composite board comprising an upper board, a lower board, and a fastener. The lower board supports the upper board. The upper board comprises a panel and a downward edge disposed on a periphery of the panel. The periphery of the panel sinks downward to define a horizontal step surface, and the downward edge extends downward from an outer edge of the horizontal step surface. The fastener comprises a buckle groove. An inner side of the buckle groove defines an opening, and the buckle groove surrounds side portions of the upper board and the lower board to fixedly clamp the upper board and the lower board together. An upper wall of the buckle groove abuts the horizontal step surface, and a top surface of the fastener is lower than a top surface of the upper board.

11 Claims, 8 Drawing Sheets

(51) Int. Cl.
*B32B 3/12* (2006.01)
*B32B 7/08* (2019.01)
*B32B 27/08* (2006.01)
*F16B 5/00* (2006.01)
*F16B 5/06* (2006.01)

(52) U.S. Cl.
CPC .......... *F16B 5/0004* (2013.01); *F16B 5/0614* (2013.01); *B32B 2479/00* (2013.01)

(56) References Cited

U.S. PATENT DOCUMENTS

| | | | | |
|---|---|---|---|---|
| 2,981,579 | A * | 4/1961 | Shwayder | A47B 13/08 108/27 |
| 3,294,353 | A * | 12/1966 | Rowe | E04C 2/384 248/346.01 |
| 5,173,348 | A * | 12/1992 | Gevaert | A47B 13/083 312/137 |
| 5,551,352 | A * | 9/1996 | Meier | A47B 13/083 108/157.18 |
| 5,947,037 | A * | 9/1999 | Hornberger | A47B 13/083 108/115 |
| 6,694,897 | B2 * | 2/2004 | Lou-Hao | A47B 3/091 108/132 |
| 7,635,114 | B2 * | 12/2009 | Laws | E04H 17/168 256/19 |
| 8,181,579 | B2 * | 5/2012 | Leng | A47B 13/086 108/27 |
| 9,750,340 | B2 * | 9/2017 | Turner | A47B 3/087 |

FOREIGN PATENT DOCUMENTS

| | | |
|---|---|---|
| CN | 106363912 A | 2/2017 |
| CN | 207657291 U | 7/2018 |
| EP | 0330228 A2 | 8/1989 |

* cited by examiner

PLASTIC COMPOSITE BOARD

RELATED APPLICATIONS

This application is a continuation of and claims priority to International Patent Application PCT/CN2018/115532, filed on Nov. 15, 2018, which claims priority to Chinese Patent Application 201721526196.3, filed on Nov. 15, 2017. International Patent Application PCT/CN2018/115532 and Chinese Patent Application 201721526196.3 are incorporated herein by reference.

FIELD OF THE DISCLOSURE

The present disclosure relates to a plastic composite board, and in particular relates to a composite board desktop.

BACKGROUND OF THE DISCLOSURE

There are many types of plastic board structures, such as single-board structures and multiple-board composite structures. Multiple-board composite structures generally comprise an upper board and a lower board, and glue is usually used to bond the boards together. At the same time, in order to improve a compression resistance of the boards and ensure that an upper surface of the multiple-board composite structure is flat, side edge structures are formed at the sides of the upper board and the lower board. The side edge structures are also glued to the upper and lower board.

However, the area of the side edge structure is small, and bonding with glue is difficult. Therefore, the glue needs to have good adhesion performance.

BRIEF SUMMARY OF THE DISCLOSURE

The present disclosure provides a plastic composite board with good strength and that is easy to be manufactured.

In order to solve the aforementioned technical problems, a technical solution of the present disclosure is as follows.

A plastic composite board comprises an upper board, a lower board, and a fastener. The lower board supports the upper board. The upper board comprises a panel and a downward edge disposed on a periphery of the panel. The periphery of the panel sinks downward to define a horizontal step surface, and the downward edge extends downward from an outer edge of the horizontal step surface. The fastener comprises a buckle groove. An inner side of the buckle groove defines an opening, and the buckle groove surrounds side portions of the upper board and the lower board to fixedly clamp the upper board and the lower board together. An upper wall of the buckle groove abuts the horizontal step surface, and a top surface of the fastener is lower than a top surface of the upper board.

In a preferred embodiment, the fastener is obtained by bending a metal sheet. The fastener further comprises an upper press edge, a side block edge, a lower press edge, and a vertical edge connected in series. The upper press edge, the side block edge, and the lower press edge are arranged to define the buckle groove.

In a preferred embodiment, a lower end of the vertical edge curls inward to define a curled edge.

In a preferred embodiment, the fastener is obtained by bending a metal sheet, and the fastener further comprises a bottom support frame connected to a lower end of the buckle groove.

In a preferred embodiment, the fastener further comprises an upper press edge, an outer block edge, a lower bottom edge, an inner block edge, a lower press edge, and a connection edge connected in series. The connection edge abuts the outer block edge. The outer block edge, the lower bottom edge, the inner block edge, and the lower press edge are arranged to define the bottom support frame. The upper press edge abuts the horizontal step surface, and the lower press edge abuts the lower board.

In a preferred embodiment, the fastener is an aluminum member. The fastener further comprises a bottom support frame, a side block edge extending vertically upward from an outer end of a top surface of the bottom support frame, and an upper press edge extending horizontally inward from a top end of the side block edge. The top surface of the bottom support frame, the side block edge, and the upper press edge are arranged to define the buckle groove. The upper press edge abuts the horizontal step surface, and the top surface of the bottom support frame abuts the lower board.

In a preferred embodiment, an inner side of a lower portion of the bottom support frame comprises a guide angle, and a width of a bottom surface of the bottom support frame is smaller than a width of the horizontal step surface.

In a preferred embodiment, an inner end of the top surface of the bottom support frame extends horizontally inward to define a support board.

In a preferred embodiment, a periphery of the lower board comprises a reinforcing edge horizontally disposed, and the reinforcing edge supports a lower end of the horizontal step surface of the panel.

In a preferred embodiment, the lower board comprises a honeycomb-shaped board and an upward edge connected to a periphery of the honeycomb-shaped board. The upward edge abuts the downward edge.

Compared with existing techniques, the technical solution provided by the present disclosure has the following advantages.

The fastener is respectively tightly connected to the upper board and the lower board to fixedly clamp the upper board and the lower board together. A periphery of the upper board is fixedly connected to lower board by clamping, and a pressure resistance of the plastic composite board is greatly improved. At the same time, the fastener is easy to assemble and is convenient for automatic production.

The top surface of the fastener is lower than the top surface of the upper board. When two of the plastic composite boards are stacked face to face, the fastener can prevent a surface of the plastic composite board from being scratched.

BRIEF DESCRIPTION OF THE DRAWING

The present disclosure will be further described below with the combination of the accompanying drawings and the embodiments.

DETAILED DESCRIPTION OF THE EMBODIMENTS

Embodiment 1

Figure 1:
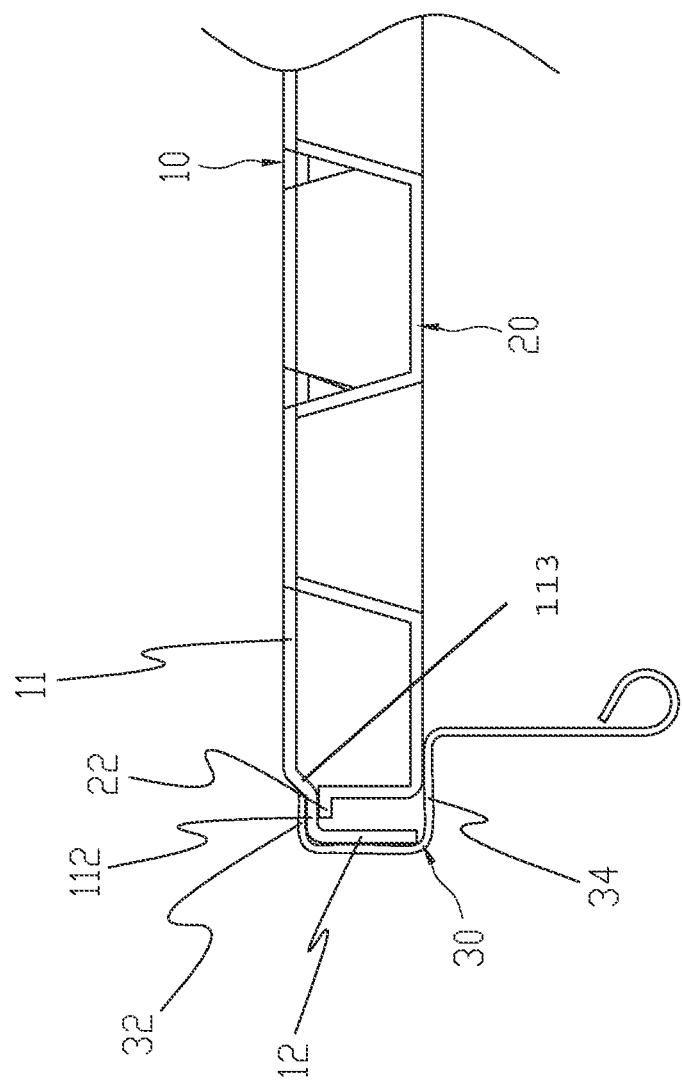
FIG. 1 illustrates a partial cross-sectional view of a plastic composite board of Embodiment 1 of the present disclosure.
Figure 2:
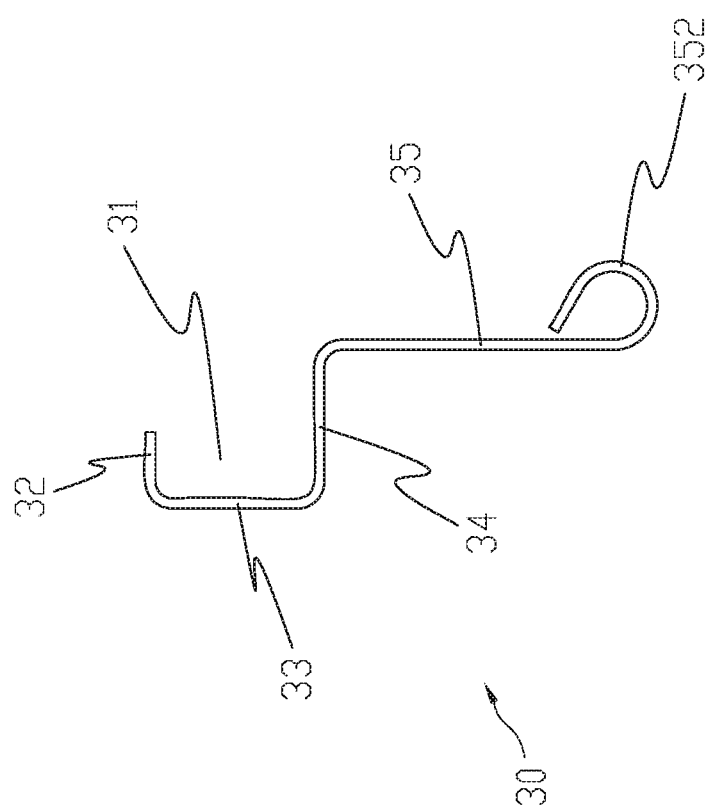
FIG. 2 illustrates a cross-sectional view of a fastener in FIG. 1.

Referring to FIGS. 1 and 2, a plastic composite board comprises an upper board 10, a lower board 20, and a fastener 30. The lower board 20 supports the upper board 10. The upper board 10 and the lower board 20 are vacuum-formed plastics. The lower board 20 evenly comprises honeycomb-shaped holes to improve a strength of the lower board 20. The upper board 10 comprises a panel 11 and a downward edge 12 disposed on a periphery of the panel 11. The periphery of the panel 11 sinks downward and outward to define a first inclined surface 113, and a periphery of the first inclined surface 113 extends outward to define a horizontal step surface 112. The downward edge 12 extends downward from an outer edge of the horizontal step surface 112. The fastener 30 comprises a buckle groove 31, and an inner side of the buckle groove 31 are arranged to define an opening. The buckle groove 31 (e.g., the opening of the buckle groove 31) surrounds side portions of the upper board 10 and the lower board 20 to fixedly clamp the upper board 10 and the lower board 20 together, and the upper board 10, the lower board 20, and the fastener 30 (e.g., the buckle groove 31) define a whole member. An upper wall of the buckle groove 31 abuts the horizontal step surface 112, and a top surface of the fastener 30 is lower than a top surface of the upper board 10. That is, an upper wall of the buckle groove 31 is lower than the top surface of the panel 11.

The fastener 30 is obtained by bending a metal sheet. The fastener 30 comprises an upper press edge 32, a side block edge 33, a lower press edge 34, and a vertical edge 35 connected in series. The upper press edge 32, the side block edge 33, and the lower press edge 34 define the buckle groove 31. A lower end of the vertical edge 35 curls inward to define a curled edge 352. The upper press edge 32 defines the upper wall of the buckle groove 31, and the upper press edge 32 abuts the horizontal step surface 112.

In some embodiments, a periphery of the lower board 20 comprises a reinforcing edge 22 horizontally disposed. The reinforcing edge 22 supports a lower side of the horizontal step surface 112 of the panel 11.

Embodiment 2

Figure 3:
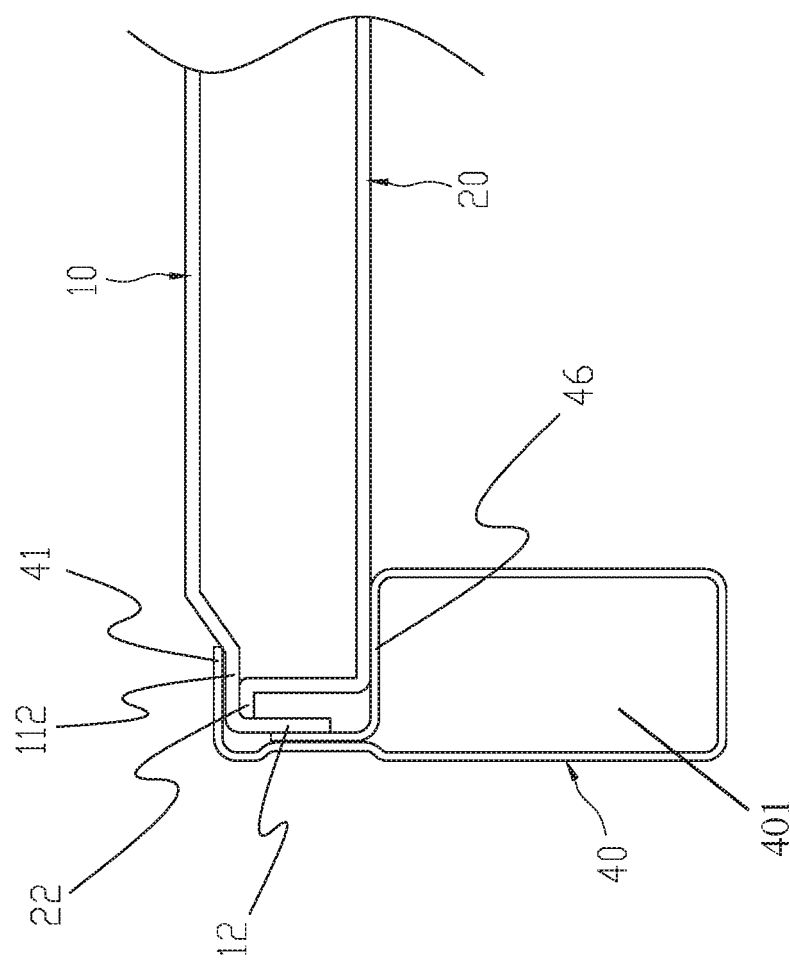
FIG. 3 illustrates a cross-sectional view of a portion of a plastic composite board of Embodiment 2 of the present disclosure.
Figure 4:
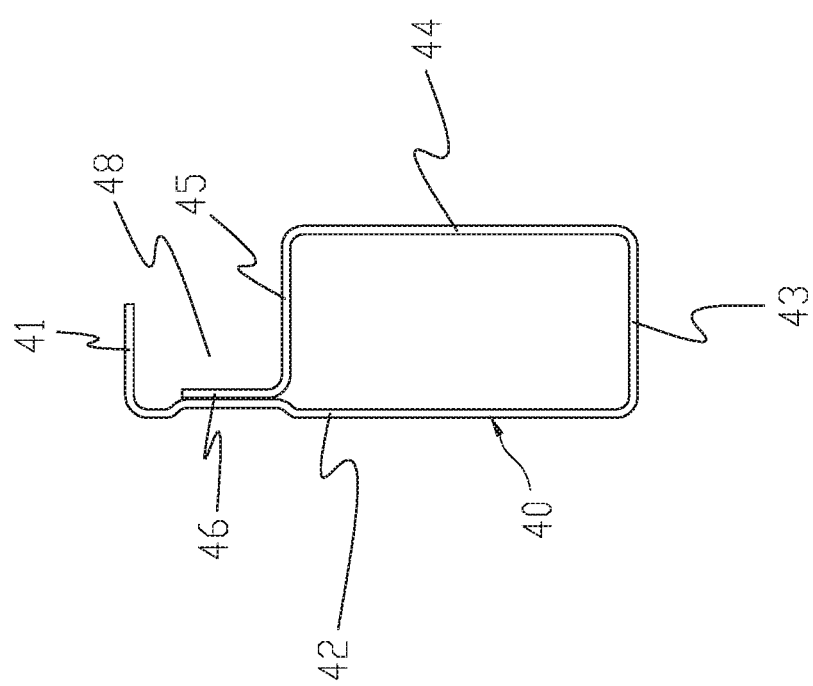
FIG. 4 illustrates a cross-sectional view of a fastener in FIG. 3.

Referring to FIGS. 3 and 4, this embodiment differs Embodiment 1 in that an upper part of a fastener 40 comprises a buckle groove 48. The function of the buckle groove 48 is the same as the function of the buckle groove 31. The buckle groove 48 is configured to fixedly clamp the upper board 10 and lower board 20. A lower part of the fastener 40 comprises a bottom support frame 401. In this embodiment, the fastener 40 comprises an upper press edge 41, an outer block edge 42, a lower bottom edge 43, an inner block edge 44, a lower press edge 45, and a connection edge 46 connected in series. The connection edge 46 abuts the outer block edge 42. The outer block edge 42, the lower bottom edge 43, the inner block edge 44, and the lower press edge 45 are arranged to define the bottom support frame 401. The upper press edge 41 abuts the horizontal step surface 112, and the lower press edge 45 abuts the lower board 20.

The bottom support frame 401 of the fastener 40 can really enhance a strength of the fastener 40.

Embodiment 3

Figure 5:
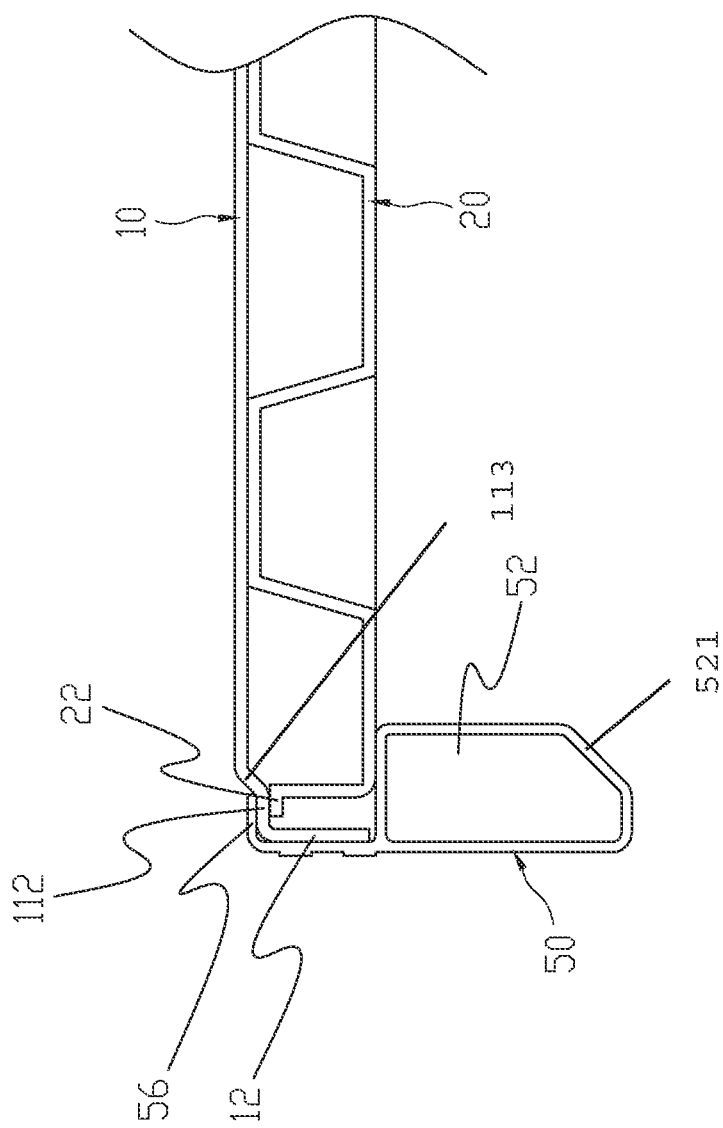
FIG. 5 illustrates a cross-sectional view of a portion of a plastic composite board of Embodiment 3 of the present disclosure.
Figure 6:
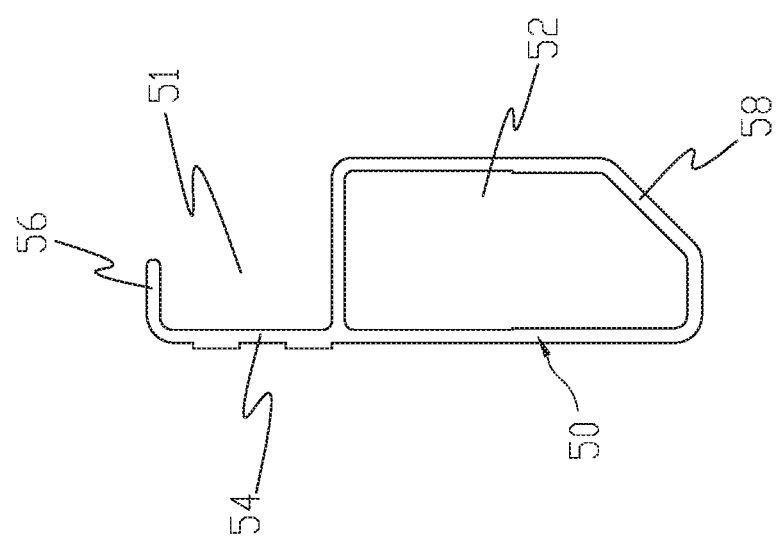
FIG. 6 illustrates a cross-sectional view of a fastener in FIG. 5.

Referring to FIGS. 5 and 6, this embodiment differs from Embodiment 1 in that a fastener 50 is an aluminum member. The fastener 50 comprises a bottom support frame 52, a side block edge 54 extending vertically upward from an outer end of a top surface of the bottom support frame 52, and an upper press edge 56 extending horizontally inward from a top end of the side block edge 54. The top surface of the bottom support frame 52, the side block edge 54, and the upper press edge 56 are arranged to define a buckle groove 51. The function of the buckle groove 51 is the same as the function of the buckle groove 31. The buckle groove 51 is configured to fixedly clamp the upper board 10 and the lower board 20. The upper press edge 56 abuts the horizontal step surface 112, and the top surface of the bottom support frame 52 abuts the lower board 20. An inner side of a lower portion of the bottom support frame 52 comprises a guide angle 58 to enable a width of a bottom surface of the bottom support frame 52 to be smaller than a width of the horizontal step surface 112. When a plurality of the plastic composite boards are stacked together, the bottom surface of the bottom support frame 52 of the fastener 50 of an upper plastic composite board of the plurality of plastic composite boards is configured to be supported on the upper press edge 56 of the fastener 50 of a lower plastic composite board of the plurality of plastic composite boards, and the horizontal step surface 112 is configured to effectively prevent the upper plastic composite board from sliding leftward and rightward relative to the lower plastic composite board. A side of the bottom support frame 52 facing an inner side of the panel 11 defines a second inclined surface 521 extending upward and inward from a bottom of the side of the bottom support frame 52, and the first inclined surface 113 cooperates with the second inclined surface 521.

Embodiment 4

Figure 7:
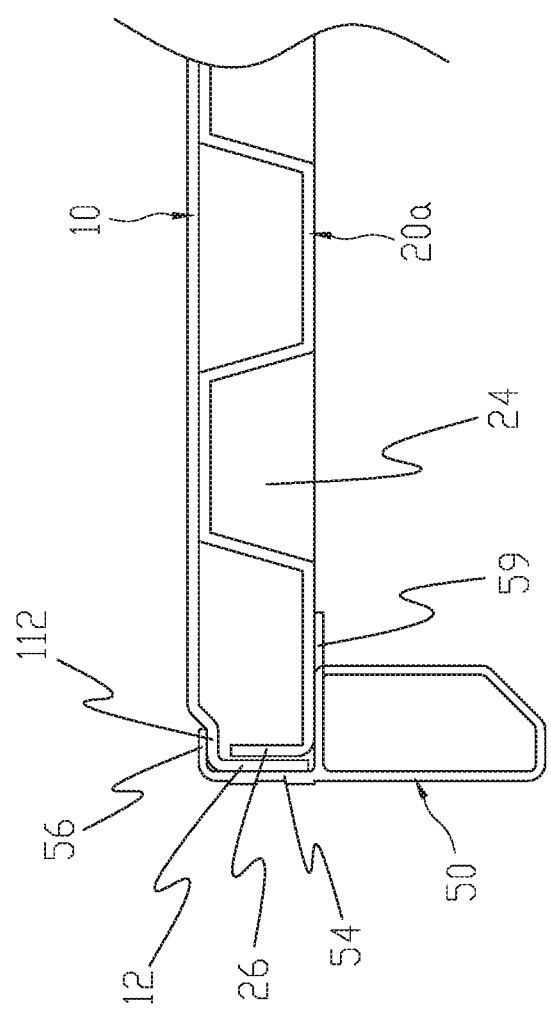
FIG. 7 illustrates a cross-sectional view of a portion of a plastic composite board of Embodiment 4 of the present disclosure.
Figure 8:
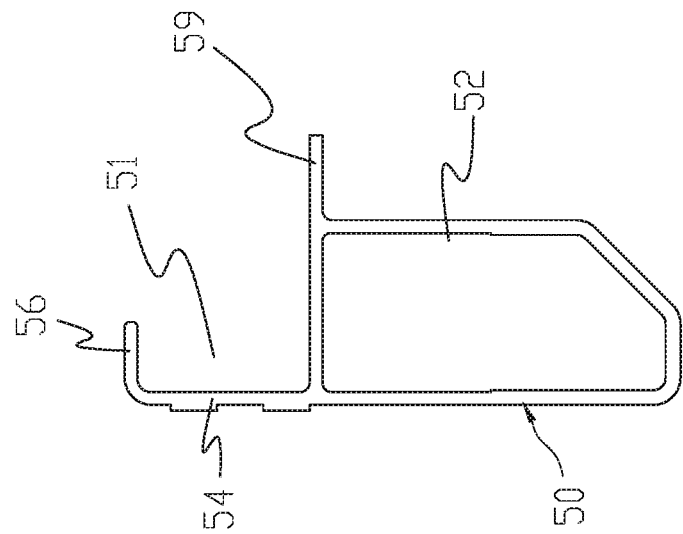
FIG. 8 illustrates a cross-sectional view of a fastener in FIG. 7.

Referring to FIGS. 7 and 8, this embodiment differs from Embodiment 3 in that an inner end of the top surface of the bottom support frame 52 extends horizontally inward to define a support board 59 to increase a support area of a lower board 20a. In addition, the lower board 20a comprises a honeycomb-shaped board 24 and an upward edge 26 connected to a periphery the honeycomb-shaped board 24. The upward edge 26 abuts the downward edge 12 of the upper board 10 to further improve a strength of the plastic composite board.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:

1. A plastic composite board, comprising:
an upper board,
a lower board, and
a fastener, wherein:

the lower board supports the upper board,
the upper board comprises a panel and a downward edge disposed on a periphery of the panel,
the periphery of the panel sinks downward and outward to define a first inclined surface,
a periphery of the first inclined surface extends outward to define a horizontal step surface,
the downward edge extends downward from an outer edge of the horizontal step surface,
the fastener comprises a buckle groove,
an inner side of the buckle groove defines an opening,
the buckle groove surrounds side portions of the upper board and the lower board to fixedly clamp the upper board and the lower board together,
an upper wall of the buckle groove abuts the horizontal step surface, and
a top surface of the buckle groove is lower than a top surface of the upper board.

2. The plastic composite board according to claim 1, wherein:
the fastener is formed by bending a metal sheet,
the fastener further comprises an upper press edge, a side block edge, a lower press edge, and a vertical edge connected in series, and
the upper press edge, the side block edge, and the lower press edge are arranged to define the buckle groove.

3. The plastic composite board according to claim 2, wherein a lower end of the vertical edge curls inward to define a curled edge.

4. The plastic composite board according to claim 1, wherein:
the fastener is formed by bending a metal sheet, and
the fastener further comprises a bottom support frame connected to a lower end of the buckle groove.

5. The plastic composite board according to claim 4, wherein:
the fastener further comprises an upper press edge, an outer block edge, a lower bottom edge, an inner block edge, a lower press edge, and a connection edge connected in series,
the connection edge abuts the outer block edge,
the outer block edge, the lower bottom edge, the inner block edge, and the lower press edge are arranged to define the bottom support frame,
the upper press edge abuts the horizontal step surface, and
the lower press edge abuts the lower board.

6. The plastic composite board according to claim 4, wherein:
a side of the bottom support frame facing an inner side of the panel defines a second inclined surface extending upward and inward from a bottom of the side of the bottom support frame.

7. The plastic composite board according to claim 1, wherein:
the fastener is an aluminum member,
the fastener further comprises a bottom support frame, a side block edge extending vertically upward from an outer end of a top surface of the bottom support frame, and an upper press edge extending horizontally inward from a top end of the side block edge,
the top surface of the bottom support frame, the side block edge, and the upper press edge are arranged to define the buckle groove,
the upper press edge abuts the horizontal step surface, and
the top surface of the bottom support frame abuts the lower board.

8. The plastic composite board according to claim 7, wherein:
an inner side of a lower portion of the bottom support frame comprises a guide angle, and
a width of a bottom surface of the bottom support frame is smaller than a width of the horizontal step surface.

9. The plastic composite board according to claim 8, wherein an inner end of the top surface of the bottom support frame extends horizontally inward to define a support board.

10. The plastic composite board according to claim 1, wherein:
a periphery of the lower board comprises a reinforcing edge horizontally disposed, and
the reinforcing edge supports a lower end of the horizontal step surface.

11. The plastic composite board according to claim 1, wherein:
the lower board comprises a honeycomb-shaped board and an upward edge connected to a periphery of the honeycomb-shaped board, and
the upward edge abuts the downward edge.

* * * * *